G. C. PITTS & P. FILIP.
CULTIVATOR.
APPLICATION FILED APR. 21, 1915.
1,201,982.
Patented Oct. 17, 1916.
2 SHEETS—SHEET 1.
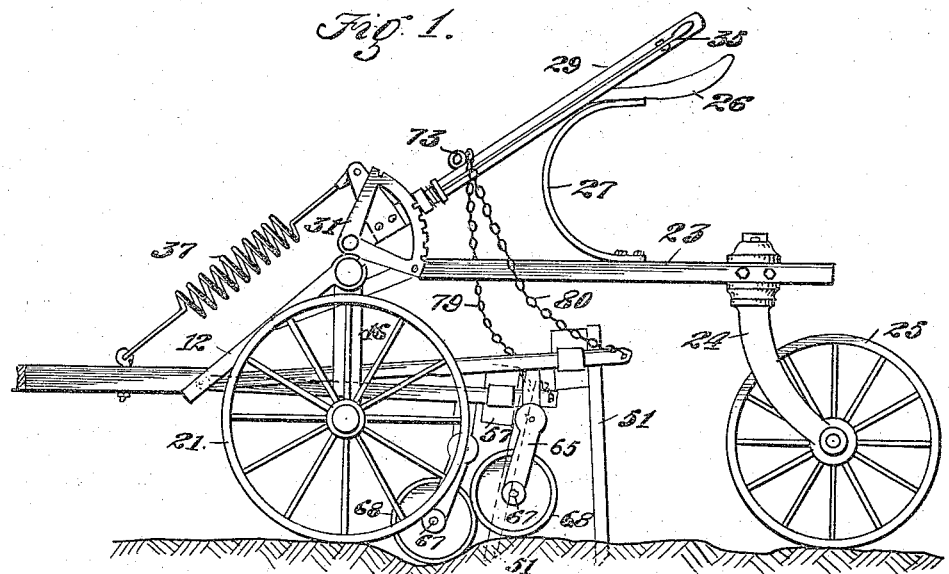
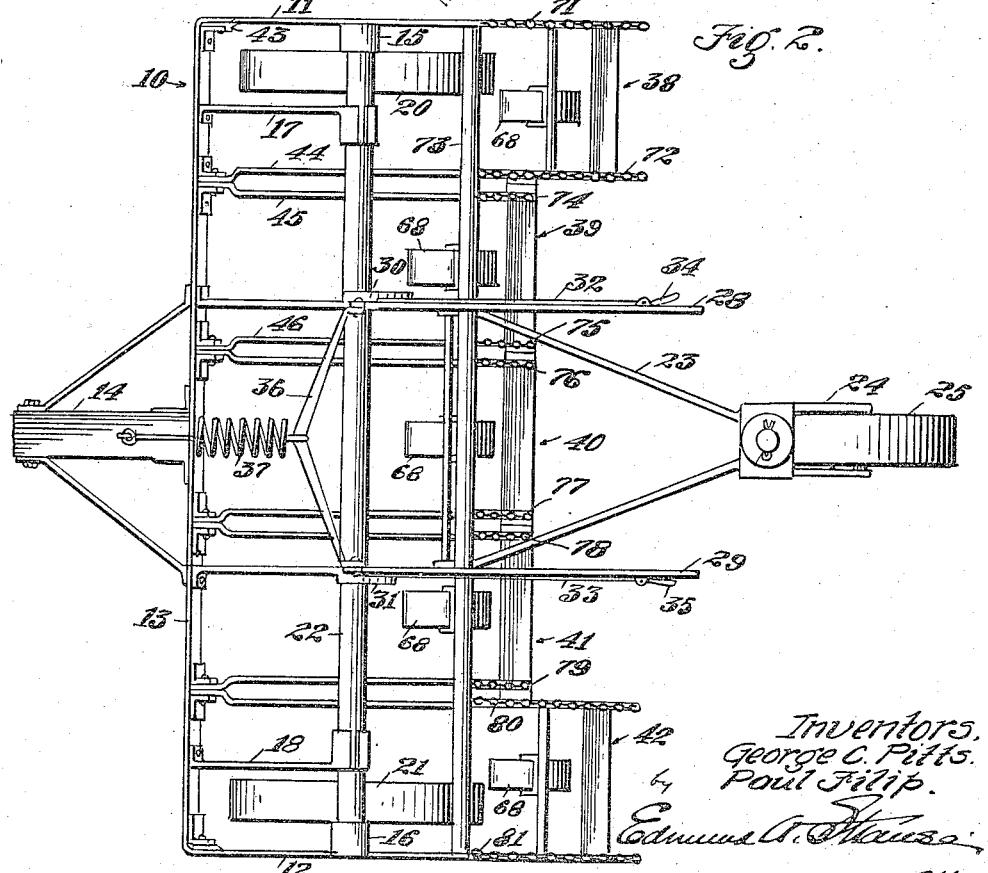
Inventors,
George C. Pitts.
Paul Filip.

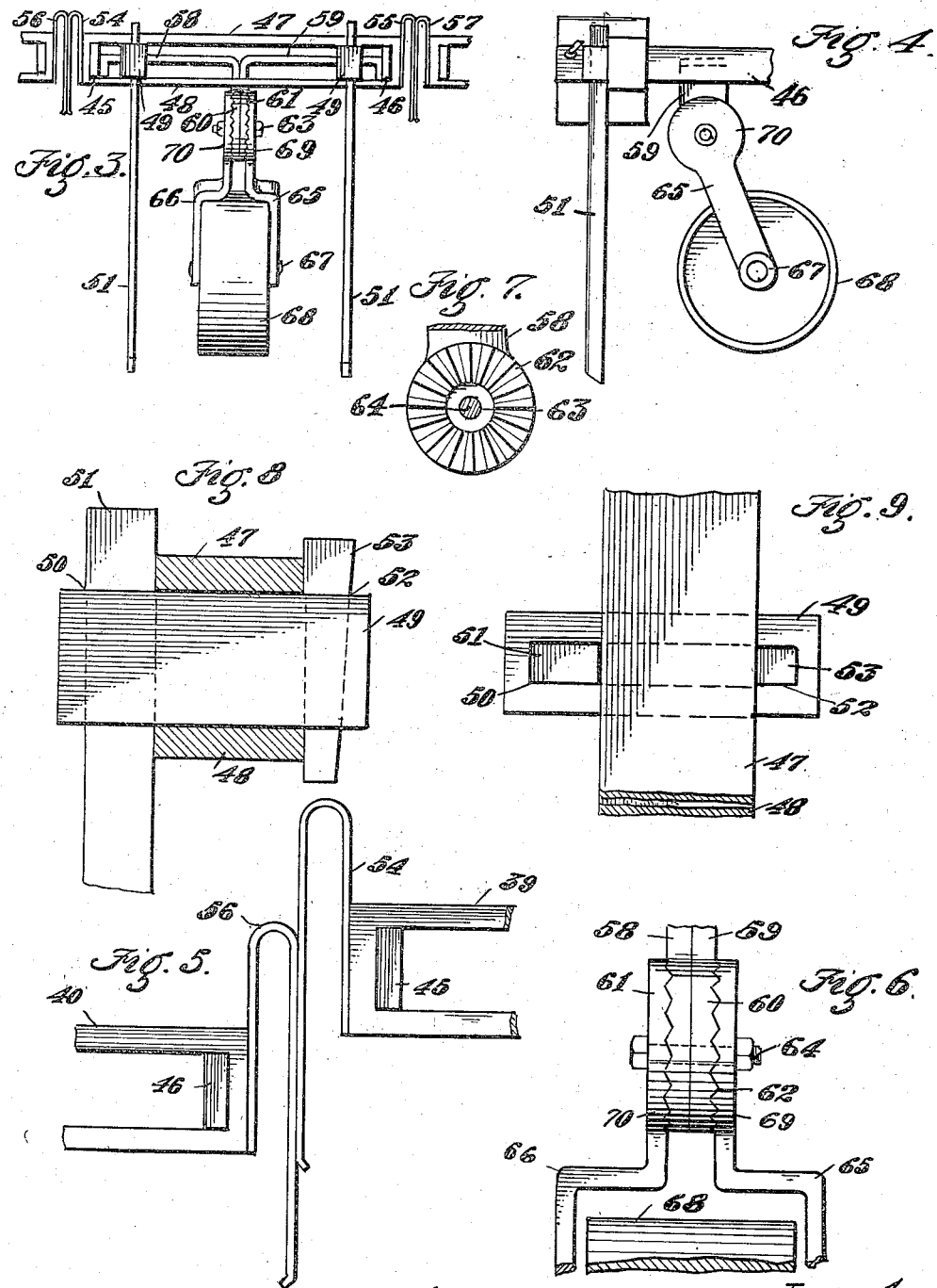

UNITED STATES PATENT OFFICE.

GEORGE C. PITTS AND PAUL FILIP, OF OXNARD, CALIFORNIA.

CULTIVATOR.

1,201,982.　　　　Specification of Letters Patent.　　Patented Oct. 17, 1916.

Application filed April 21, 1915. Serial No. 22,816.

*To all whom it may concern:*

Be it known that we, GEORGE C. PITTS, a citizen of the United States, and PAUL FILIP, a subject of the Emperor of Austria-Hungary, both residing at Oxnard, in the county of Ventura and State of California, have invented new and useful Improvements in Cultivators, of which the following is a specification.

This invention relates to cultivators and the primary object is to provide a cultivator with mechanism for carrying the tools which will automatically adjust itself to variations in the surface of the ground and maintain the tools at a given depth in the ground.

It is another object of this invention to provide a cultivator having a plurality of tools which are automatically adjusted to the ground level with means for adjusting the depth to which a tool enters the ground.

It is a further object to provide a cultivator with means for securing the cultivator tools which will require no wrenches or similar tools for securing the cultivator tools to or removing them from the cultivator.

Heretofore cultivators have been constructed with a rigid frame for carrying tools and means for lifting at will either or both ends of the cultivator frame, thereby providing manual means for adjusting the depth of the tool in the ground. Such structures require the constant attention of the operator in order that the depth of cultivation be uniform. If there are variations in the contour of the surface of the ground such that there is a low spot between the points over which the transporting wheels are riding, the low spot will not be affected by the cultivator tools. If the tools on one side of the frame are deeper in the ground than the other it has a tendency to swing the tongue of the machine and turn the machine from its path, thereby cutting the planted rows and in some instances cutting the plants therein.

Our improved cultivator comprises a main frame to which are pivoted a series of frames carrying cultivating tools, the frames being supported upon gage wheels which follow the contour of the ground.

We attain these objects by means of the embodiment of our invention disclosed in the accompanying drawing, in which:

Figure 1 is a side elevation. Fig. 2 is a plan view. Fig. 3 is a rear elevation of the cultivator frame gage wheel detail. Fig. 4 is a side elevation of a fragment of the cultivator frame gage wheel. Fig. 5 is a detail showing the rubbing plates between the cultivator tool frames. Fig. 6 is an enlarged fragmentary detail view showing the adjusting means for the gage wheel. Fig. 7 is a section showing a detail of the gage wheel adjusting head. Fig. 8 is a section of the tool bar, illustrating the means of attaching the tool. Fig. 9 is a fragmentary plan view of the tool bars and means of attaching the tools.

More specifically, 10 indicates the main frame of the cultivator of a well known type, which includes a cross bar 13 having arms 11 and 12 extending at right angles thereto and preferably integral therewith. A draft tongue 14 of the usual construction is secured to the main frame 10 by hitch braces. Standards 15 and 16 have secured to their lower ends transporting wheels 20 and 21. A cross beam 22, preferably a pipe, is secured to the upper ends of standards 15 and 16 and has secured to it a rearwardly extending frame 23 which is provided with a fork 24 swiveled to the frame. Cross beam 22 is braced by bars 17 and 18 which are secured to cross bar 13. Fork 24 is provided with the usual tiller wheel 25. Mounted upon frame 23 is the usual seat 26 shown supported by a spring 27. The frame construction described is the usual type of cultivator frame.

Pivotally secured to cross beam 22 are levers 28 and 29. Disposed adjacent the pivotal point of the levers and fixedly secured to the cross beam 22 are toothed segments 30 and 31. The levers 28 and 29 have mounted upon them locking rods 32 and 33 provided with teeth or pawls at their ends for engagement with the ratchet teeth on segments 30 and 31. Handles 34 and 35 are provided for operating the locking rods 32 and 33. Levers 28 and 29 are provided with arms connected by a yoke 36. An expansion spring 37 connects the tongue 14 and the yoke, thereby tending to draw the levers upward.

Secured to each cross bar 13 in parallel relation are a plurality of cultivator tool frames 38, 39, 40, 41 and 42. Each of the end frames includes corresponding side bars as indicated by 43 and 43'. Side bars 43 and 43' are secured to the cross bar 13 by means of a bracket and are off-set underlying arms 11 and 12 respectively. Side bar 44 is included in tool frame 38 and is oppositely disposed to side bar 43. Side bar 44 is included in tool frame 42 and is oppositely disposed to side bar 43'. Any well known means of pivoting the side bars to the cross bars may be used. I have shown bracket angles fixed to the cross bars provided with apertures through which pivot pins for the cross bar are passed. The intermediate frames 39, 40, and 41 similarly include side bars as indicated at 45 and 46. The latter being pivotally connected to the cross bar 13 by means of brackets.

Connecting the free ends of each pair of side bars are tool securing bars. Referring particularly to Fig. 3, the securing tool bars are shown connected between side bars 45 and 46, and are comprised of vertically spaced bars 47 and 48 adapted to receive tool holders 49. Tool holders 49 are apertured as indicated at 50, Figs. 8 and 9, to receive the shank of a cultivator tool 51. At the other end of the tool holder is an aperture 52 adapted to receive a wedge 53. The tool holder is disposed between bars 47 and 48, the shank 51 of the cultivator tool is inserted in the aperture 50, and a wedge 53 is driven into aperture 52 clutching the tool securely and holding it in position against the bars 47 and 48.

Secured to the side bars of the cultivator tool frames are rubbing plates 54 and 55 which are adapted to coöperate with rubbing plates 56 and 57, see Fig. 3. Each rubbing plate comprises a plate of resilient material which is bent parallel with itself. Rubbing plates 54 and 56, see Fig. 5, engage one another so that relative movement of the cultivator tool frame to which they are attached may occur without the ends of the frame overlapping and catching one another.

Secured to side bars 45 and 46 are bars 58 and 59 which are bent in angular form. Each of the angular bars is provided with heads 60 and 61 of circular form and having its face provided with serrations 62. An aperture 63 is provided in each head for the reception of a tightening bolt 64. A fork for the gage wheels comprises two members 65 and 66 each of which is secured to the shaft 67 which carries a gage wheel 68. The forks at their upper ends are provided with heads 69 and 70 which have serrations on their inner faces and which are adapted to engage with the grooves between serrations on the heads 60 and 61. It will be noted that gage wheel 68 may be adjusted as to its vertical distance below the cultivator tool frame by adjusting the angular position of the gage wheel fork with respect to the bars 58 and 59. Such adjustment may be made by loosening the nut on the tightening bolt 64, moving the gage wheel to the desired position and then tightening the bolt.

The cultivator tools may be fixed to the frame and the gage wheel and the tools adjusted so that they will extend the desired distance below the gage wheel. Chains 71 and 72 are connected to the side bars 43 and 44 and to a bar 73 which is secured to levers 28 and 29. In a similar way the chains 74, 75, 76, 77, 78, 79 and 80 are connected to cultivator tool frames and the bar 73.

In the operation of the device, the gage wheels are adjusted with respect to the tools to give the proper depth of cultivation. As the cultivator is pulled forward the gage wheels travel over the surface of the ground, following the contour thereof and thereby cultivating the ground at equal depths and exerting a uniform strain upon the entire frame, resulting in no tendency to throw the cultivator out of the desired path of travel. When it is desired to turn the cultivator, levers 28 and 29 are lifted; this may be accomplished by pressing upon the handles 34 and 35 of the locking bars and raising the levers, the chains lifting the cultivator frames. The position of the levers 28 and 29 while the machine is cultivating should be adjusted so that sufficient slack is left in the chain for the frames to move and permit the tools to enter the lowest levels of the ground.

What we claim is:

1. In a cultivator, the combination of a main frame provided with transporting wheels and having a cross bar, a plurality of cultivator tool frames comprising spaced parallel side bars, means pivotally securing said side bars to said cross bar, tool securing bars mounted between each pair of side bars, standards mounted on said main frame, hand levers pivotally mounted on said standards, a bar secured to said levers, and flexible members secured to the last mentioned bar and to each of the cultivator tool frames so as to be slack in normal operation of the cultivator.

2. In a cultivator, the combination of a main frame, provided with transporting wheels and having a cross bar, a plurality of cultivator tool frames comprising spaced parallel side bars, means pivotally securing said side bars to said cross bar, tool securing bars mounted between each pair of side bars, standards mounted on said main frame, hand levers pivotally mounted on said standards, toothed segments secured to said main frame, pawls secured to said levers for engaging said segments, a bar secured to said levers, and flexible members secured to the last mentioned bar and to each of the cultivator tool frames so as to be slack in normal operation of the cultivator.

3. In a cultivator, the combination of a main frame provided with transporting wheels and having a cross bar, a plurality of cultivator tool frames comprising spaced parallel side bars, means pivotally securing said side bars to said cross bar, tool securing bars mounted between each pair of side bars, standards mounted on said main frame, hand levers pivotally mounted on said standards, a bar secured to said levers, flexible members secured to the last mentioned bar and to each of the cultivator tool frames so as to be slack in normal operation of the cultivator, and resilient means secured to said hand levers and to said main frame adjacent its forward end.

In witness that we claim the foregoing we have hereunto subscribed our names this 14th day of April, 1915.

GEORGE C. PITTS.
PAUL FILIP.

Witness:
FRANK WASSERMAN.

Copies of this patent may be obtained for five cents each, by addressing the "Commissioner of Patents, Washington, D. C."